United States Patent [19]

Shepherd

[11] 4,154,414

[45] May 15, 1979

[54] OPEN FACE SPINNING REEL WITH NOTCHED FLYER

[75] Inventor: Bob G. Shepherd, West Columbia, S.C.

[73] Assignee: Shakespeare Company, Columbia, S.C.

[21] Appl. No.: 927,460

[22] Filed: Jul. 24, 1978

[51] Int. Cl.² ............................................. A01K 89/01
[52] U.S. Cl. ............................................... 242/84.2 E
[58] Field of Search ................... 242/84.2 A, 84.2 R, 242/84.2 E, 84.21 R, 84.21 A

[56] References Cited

U.S. PATENT DOCUMENTS

| | | | |
|---|---|---|---|
| 3,253,801 | 5/1966 | Rouanet | 242/84.21 R |
| 3,298,629 | 1/1967 | Small | 242/84.2 A |
| 3,906,816 | 9/1975 | Nepote | 242/84.21 R |

FOREIGN PATENT DOCUMENTS 1297847  5/1962  France ............................. 242/84.2 A Primary Examiner—Billy S. Taylor
Attorney, Agent, or Firm—Hamilton, Renner & Kenner

[57] ABSTRACT

An open face type fishing reel having a flyer (24) rotatable on the spool shaft (14) and having an inclined peripheral notch (34) for catching and winding the line on the spool (15), rotation of the flyer causing the notch to pick up and direct the line onto the spool. Limited retrorotation of the flyer axially displaces the spool to casting position, and means (38) (44) are provided to lock it in casting position, and to release and return the spool to closed position when the flyer is rotated to retrieve the line.

11 Claims, 12 Drawing Figures

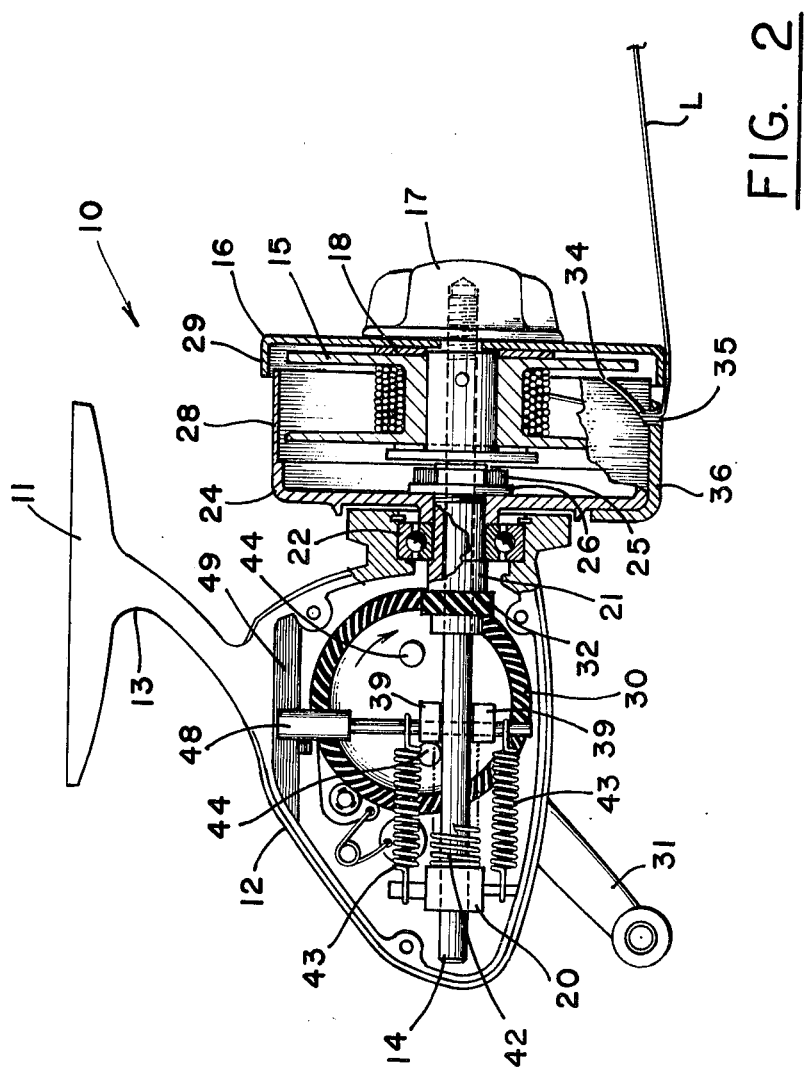

OPEN FACE SPINNING REEL WITH NOTCHED FLYER

TECHNICAL FIELD

In fishing reels used for spinning and spin casting the line spool is generally fixed during the casting and line-retrieving operations, thus eliminating a number of disadvantages experienced with bait casting reels including the inherent occurrence of backlash, dissipation of which is effected only by difficult expertise in the application of one's thumb against the rotating line spool.

BACKGROUND ART

The conventional open face spinning reel has a bail pivoted on the flyer which extends over the line spool to engage the line and wind it on the spool during retrieving, and the bail is flipped by the fisherman to an out-of-the-way position just before casting so that the line freely uncoils from the line spool during the cast. When the flyer is rotated to retrieve the line, the bail automatically flips back to retrieving position.

In my copending application Ser. No. 896,792, filed Apr. 17, 1978, there is disclosed an open face spinning reel which utilizes a line pick-up finger fixedly supported on the flyer in such manner as to move helically about the spool due to the compound movement resulting from relative rotation and axial reciprocation of the flyer, so as to move the finger from a line pick-up position to a position clear of the spool.

DISCLOSURE OF INVENTION

The present invention provides an open face spinning reel which requires neither a conventional bail nor a pick-up finger.

It is an object of the present invention to provide a simple, compact and inexpensive open face reel construction in which the flyer is moved from line retrieving to casting position by mere retrorotation of the flyer.

Another object is to provide an improved open face reel having a flyer with a pick-up notch which automatically picks up and winds the line on the spool during the retrieving operation.

A further object is to provide improved means actuated by retrorotation of the crank handle for axially displacing the spool to casting position and locking it in casting position, and for automatically releasing the spool and returning it to retrieving position when retrieving rotation of the crank handle is initiated.

These and other objects are accomplished by the improvements comprising the present invention, a preferred embodiment of which is disclosed by way of example in the accompanying drawings and specification as constituting the best known mode of carrying out the invention. Various modifications and changes in details of construction are comprehended within the scope of the appended claims.

BRIEF DESCRIPTION OF DRAWINGS

FIG. 2 is a similar view showing the reel in the closed position for line retrieval.

PREFERRED EMBODIMENT FOR CARRYING OUT THE INVENTION

Figure 1:
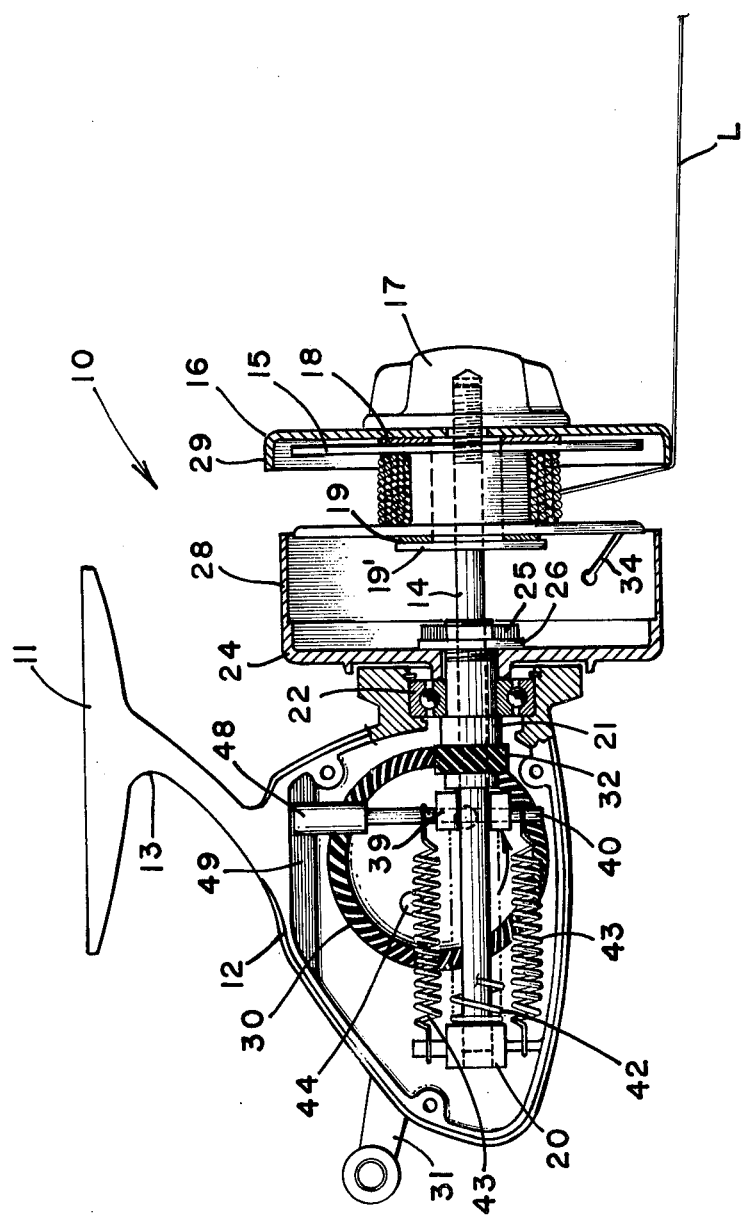
FIG. 1 is a longitudinal section taken through a spinning reel embodying the invention, showing the reel in the open position for casting.

An open face type of fishing reel embodying the concept of the present invention is designated generally at 10 in the drawings and is adapted to be mounted beneath the handle of a rod (not shown) by means of the mounting shoe 11 which is connected to the reel housing 12 by a leg 13.

The spool shaft 14 has a line spool 15 secured on its front end portion and a cover or cap 16 is rotatably mounted on the front end of the shaft by means of a nut 17 screwed thereon, which draws the cap 16 against a friction washer 18 abutting the spool. Washers 19 and 19' abut the rear side of the spool.

The rear end of shaft 14 is axially slidably mounted in a bracket arm 20 in the rear of the housing and in the front portion of the housing a sleeve 21 rotatable on shaft 14 is journaled in an anti-friction bearing 22 secured in the housing 12. A flyer 24 is secured on the front end of the sleeve and held in abutment with the inner race of bearing 22 by a nut 25 and washer 26.

The flyer 24 has a peripheral flange 28 circumscribing the spool 15, and the cap 16 has a peripheral flange 29 which circumscribes the flyer flange 28 in the line-retrieving position of FIG. 2. The drive gear 30 is rotatably mounted in a usual manner in the side of the housing 12 and has a crank handle 31 for rotating the gear. Within the housing the gear 30 meshes with a pinion 32 secured on the rear end of the sleeve 21 for rotating the flyer.

Figure 11:
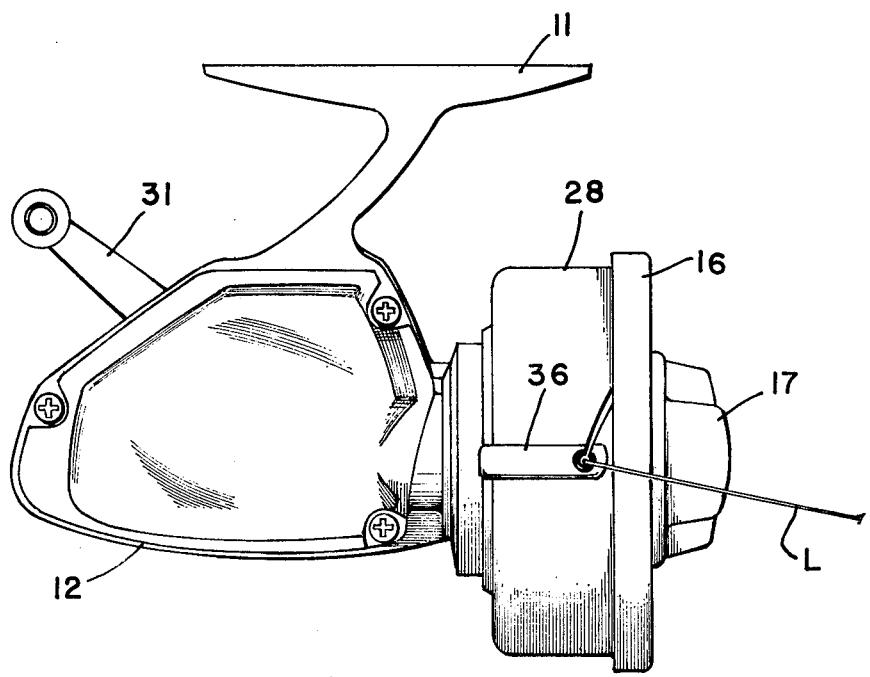
FIG. 11 is a side elevation of the reel in line-retrieving position showing the pick-up notch in the flyer.

As shown in FIGS. 1, 2 and 11 the peripheral flange 28 of the flyer is provided with an inclined line-engaging notch 34 opening at the front edge of flange 28 and terminating at its rear end in an eyelet 35 formed in a hardened steel arm 36 secured to the outer surface of flange 28.

In the line-retrieving position of FIG. 2, the line L passes through the eyelet 35, and as the drive gear is rotated clockwise, the flyer rotates around the spool and winds the line thereon. In the casting or open position of FIG. 1, the fisherman merely lifts the line L from the notch 34 with his finger and the line then freely unwinds from the spool 15 during the cast, passing over the outer peripheral edge of the cap flange 29. Thus, the usual requirement for shifting a bail or a pick-up finger out of the way before casting is obviated.

Figure 4:
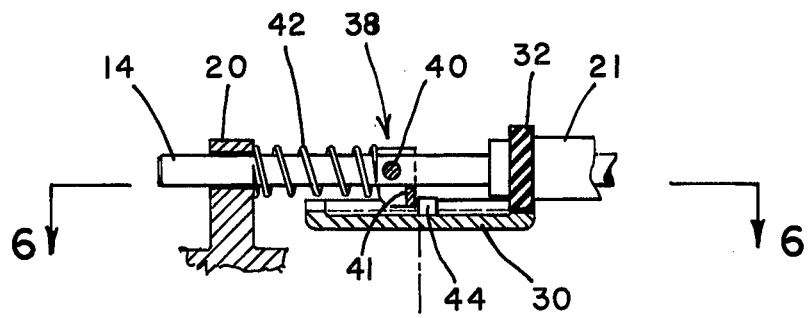
FIG. 4 is a partial sectional view with parts removed, as on line 4—4 of FIG. 3.

The mechanism for advancing the spool shaft 14 and the cap 16 secured thereto from the retrieving position of FIG. 2 to the casting position of FIG. 1 will now be described. A cocking yoke indicated as a whole at 38 is positioned over the inner face of the drive gear 30 and has two legs 39 and 39' straddling the shaft 14 and rotatable on a pivot pin 40 passing transversely through the shaft. The legs 39 and 39' are connected by a transverse web 41 passing under the shaft 14 and adapted to abut the underside of the shaft when the legs extend perpendicular to the drive gear 30, as seen in FIG. 4. A compression spring 42 encircles the shaft 14 between the lug 20 and the legs 39 and 39' for biasing the legs toward the upright position of FIG. 4, and tension springs 43 on opposite sides of the shaft 14 connect the pivot pin 40 to the housing bracket arm 20 for a purpose to be described.

Figure 3:
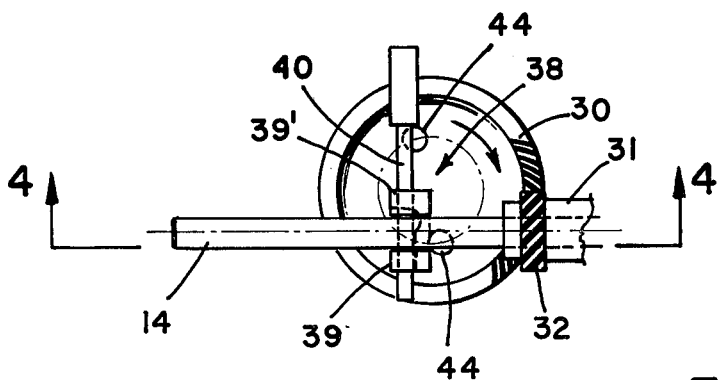
FIG. 3 is a fragmentary view, similar to FIG. 2, showing a lug on the drive gear contacting a cocking yoke pivoted on the spool shaft.
Figure 5:
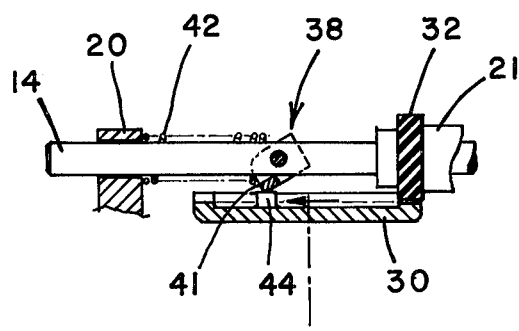
FIG. 5 is a similar view showing how the lug passes under the yoke as the drive gear is rotated to retrieve the line.
Figure 12:
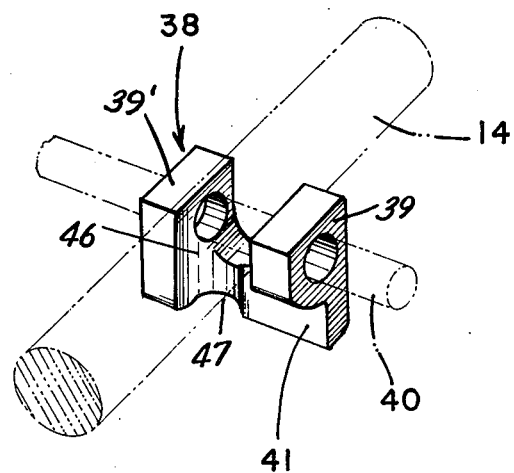
FIG. 12 is a detached perspective view of the cocking yoke.

The face of drive gear 30 is provided with studs or projections 44, preferably diametrically opposite each other, and adapted to engage the web 41 of the cocking yoke when the gear is rotated. When the gear is rotated clockwise, as viewed in FIGS. 2 and 3, to retrieve the line, the studs 44 engage the web and rock the yoke 38 to pass thereunder, as indicated in FIG. 5. When the gear is retrorotated one of the studs 44 engages the web in the manner depicted in FIGS. 6 and 7.

The bottom portion of leg 39 at the point where it is connected to the web is the same width as the web 41 but the bottom portion of leg 39' has a flange 46 along its outer side edge and a detent groove 47 is formed in the web 41 adjoining the flange 46. This detent groove 47 is adapted to receive and retain one of the studs 44 when the shaft 14 is in the casting position of FIG. 1.

Figure 6:
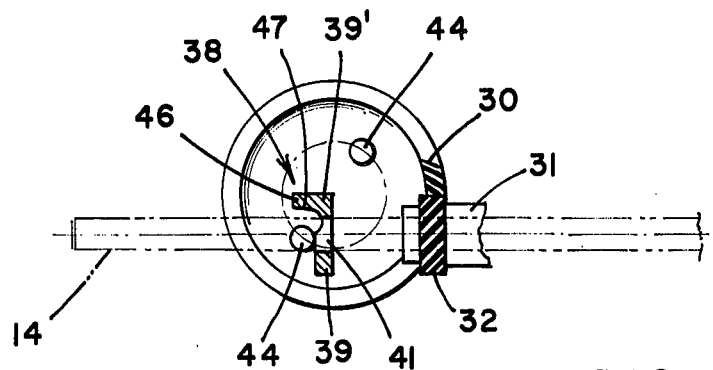
FIG. 6 is a partial sectional view with parts removed, as on line 6—6 of FIG. 4, showing how one of the lugs on the drive gear engages the yoke when the drive gear is retrorotated.
Figure 7:
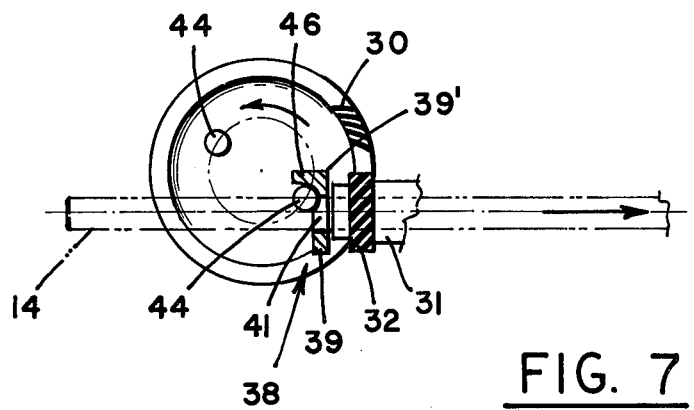
FIG. 7 is a similar view showing how the lug engages a detent groove in the yoke to lock the shaft in the casting position of FIG. 1.

When the fisherman has retrieved the line and desires to make a cast, he retrorotates the crank handle 31 to rotate it counterclockwise as viewed in FIG. 2. A partial rotation of the drive gear will bring one of the studs 44 into contact with the web 41 of the cocking block as shown in FIG. 6 and the block cannot rock because it abuts the under side of shaft 14, so that continued retrorotation of the gear moves the shaft axially forward against the tension of springs 43. As the gear rotates the arcuate path of the contacting stud 44 causes it to slide into the detent groove 47, and at that point the shaft is locked in the casting position of FIG. 1. During the forward movement of shaft 14 the cocking block and shaft are prevented from rotating laterally by a guide 48 on pivot pin 40 sliding in a guideway 49 in housing 12.

After the cast has been completed and the fisherman again rotates the drive gear to retrieve the line, the stud 44 travels its arcuate path and immediately slides out of the detent groove 47 and then, during subsequent rotation, the springs 43 return the shaft 14 to the position of FIG. 2. As soon as the shaft has returned the cap 16 to or approaching the position of FIG. 2, the peripheral flange 29 will guide the line against the peripheral flange 28 of the rotating flyer and cause it to drop into the inclined notch 34 and thence through the eyelet 35 onto the spool.

Figure 8:
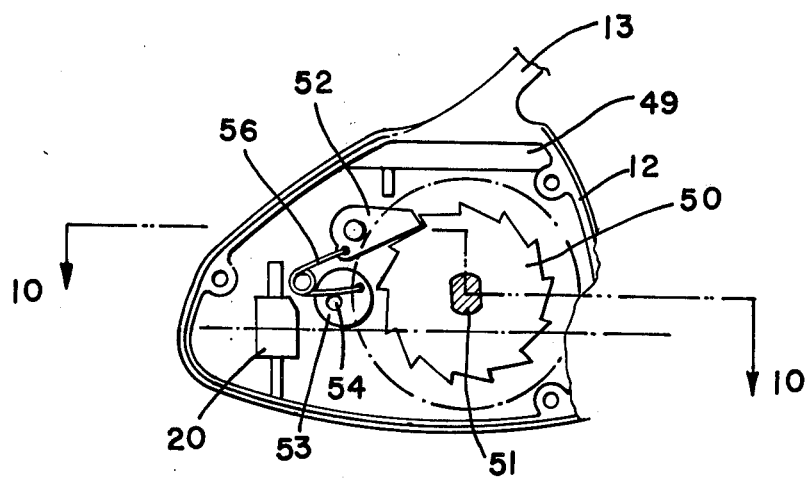
FIGS. 8 and 9 are plan sectional views taken along the undersurface of the drive gear to show the anti-reverse mechanism.
Figure 9:
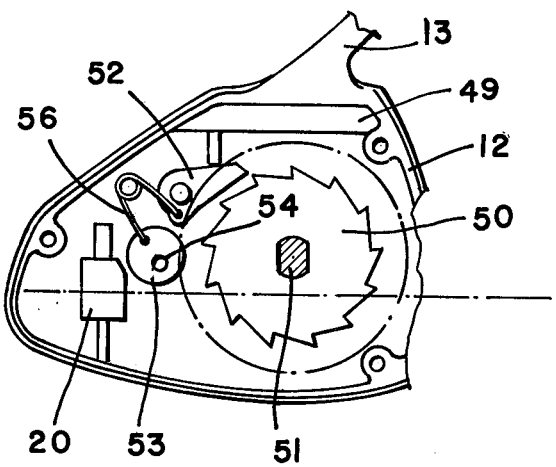
Figure 10:
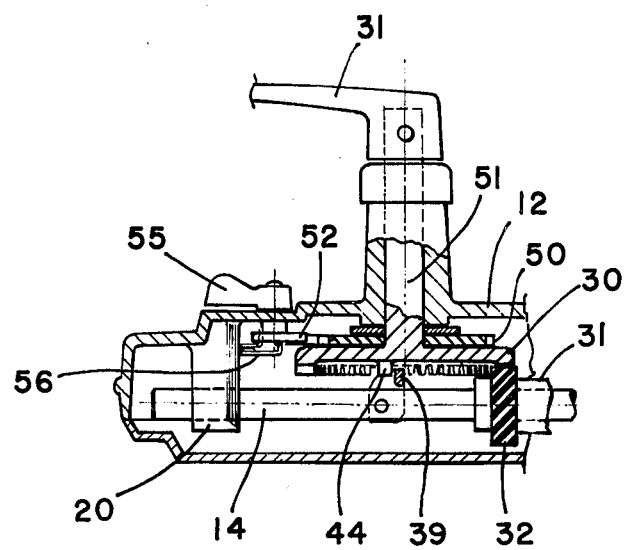
FIG. 10 is a partial sectional view as on line 10—10 of FIG. 8.

An improved anti-reverse mechanism is depicted in FIGS. 8-10, comprising a ratchet wheel 50 secured to the shaft 51 of the drive gear 30 and a click pawl 52 pivoted in the housing for engaging the teeth of the ratchet wheel to prevent retrorotation of the drive gear. A disk 53 is eccentrically secured on a pin 54 pivoted in the housing 12 and having an operating lever 55 on the exterior of the housing for rotating the pin 54 between the anti-reverse position of FIG. 8, wherein the pawl engages the ratchet teeth, and the release position of FIG. 9.

A safety pin type of spring 56 is connected between the pawl 52 and the eccentric disk at such locations that in the anti-reverse position of FIG. 8 the spring biases the pawl into engagement with the ratchet teeth, and when the pin 54 is rotated about a quarter turn to its other limit, the connection between the spring and eccentric disk 53 swings over center and the spring releases the pawl.

It will be apparent that the improved open face spinning reel is simple and compact in construction and provides for moving the flyer from line retrieving position to casting position automatically by a small amount of retrorotation of the flyer, from which position it is released and returned upon initiating rotation of the flyer to retrieve the line, the retrieving operation being accomplished without requiring a bail or a pick-up finger.

I claim:

1. An open face type fishing reel having a housing, a line spool shaft mounted in said housing for axial movement, a spool mounted on said shaft, a flyer rotatable on said shaft behind said spool and having a peripheral flange circumscribing said spool, a front cover on said shaft having a peripheral flange for circumscribing said flyer flange in line-retrieving position, said flyer flange having a notch for directing retrieved line onto said spool, a drive gear in said housing to rotate said flyer, and interengaging means on said drive gear and said spool shaft to advance said spool shaft to move said cover and said spool beyond said flyer flange when the drive gear is rotated in one direction to allow freely casting the line from the spool.

2. An open face type fishing reel as defined in claim 1, wherein said interengaging means has detent means to lock said spool shaft in advanced position.

3. An open face type fishing reel as defined in claim 2, wherein the detent means is adapted to release the spool shaft upon rotation of the drive gear in the reverse direction to retrieve the line.

4. An open face type fishing reel having a housing, a line spool shaft mounted in said housing for axial movement, a spool fixed on said shaft, a flyer rotatable on said shaft and having a peripheral flange circumscribing said spool, said flange having a notch to pick up and direct retrieved line onto the spool, a drive gear in the housing directly connected to said flyer, a cocking yoke pivoted on said shaft for rocking movement in one direction only, a projection on said drive gear to rock the yoke and pass by when the gear is rotated to retrieve the line, said projection adapted to engage said yoke and axially advance the shaft when the gear is retrorotated, and spring means biasing said yoke to line-retrieving position.

5. An open face type fishing reel as defined in claim 4, wherein detent means is provided to lock said shaft in advanced position.

6. An open face type fishing reel as defined in claim 5, wherein said detent means is on said cocking yoke.

7. An open face type fishing reel as defined in claim 6, wherein said detent means engages said projection in the advanced position of said shaft.

8. An open face type fishing reel as defined in claim 4, wherein a second spring means biases said yoke toward shaft advancing position.

9. An open face type fishing reel as defined in claim 8, wherein detent means is provided to lock said shaft in advanced position.

10. An open face type fishing reel as defined in claim 9, wherein said detent means is on said cocking yoke.

11. An open face type fishing reel as defined in claim 10, wherein said detent means engages said projection in the advanced position of said shaft.

* * * * *